United States Patent
Wagner, III

(10) Patent No.: US 10,686,304 B2
(45) Date of Patent: *Jun. 16, 2020

(54) CONNECTION SYSTEM AND METHOD OF USING SAME

(71) Applicant: Fred A. Wagner, III, Charlotte, NC (US)

(72) Inventor: Fred A. Wagner, III, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/358,863

(22) Filed: Mar. 20, 2019

(65) Prior Publication Data

US 2019/0222008 A1 Jul. 18, 2019

Related U.S. Application Data

(63) Continuation-in-part of application No. 15/729,963, filed on Oct. 11, 2017, now Pat. No. 10,280,607.

(60) Provisional application No. 62/413,578, filed on Oct. 27, 2016.

(51) Int. Cl.
| | | |
|---|---|---|
| *E04B 1/19* | (2006.01) | |
| *H02G 3/04* | (2006.01) | |
| *H02G 3/06* | (2006.01) | |
| *F16L 25/00* | (2006.01) | |
| *E04H 15/34* | (2006.01) | |
| *B23K 101/24* | (2006.01) | |

(52) U.S. Cl.
CPC .......... *H02G 3/0406* (2013.01); *E04H 15/34* (2013.01); *F16L 25/0018* (2013.01); *H02G 3/0481* (2013.01); *H02G 3/0616* (2013.01); *B23K 2101/24* (2018.08)

(58) Field of Classification Search
CPC .......... E04B 1/1903; E04B 2001/1957; E04B 2001/193; E04B 2001/2403; E04B 2001/2451
See application file for complete search history.

(56) References Cited

U.S. PATENT DOCUMENTS

| | | | |
|---|---|---|---|
| 2,747,887 A | 5/1956 | Schilberg | |
| 3,499,258 A | 3/1970 | Durand | |
| 3,512,811 A | 5/1970 | Bardgette et al. | |
| 3,674,289 A | 7/1972 | Geraci | |
| 3,769,772 A | 11/1973 | Oetiker | |
| 4,041,659 A * | 8/1977 | McElhoe | E04B 1/24 52/93.1 |
| 4,074,487 A * | 2/1978 | Daniels | E04B 1/24 52/236.3 |

(Continued)

OTHER PUBLICATIONS

Wikipedia, "Electrical Conduit," dated Oct. 25, 2016.

(Continued)

*Primary Examiner* — Beth A Stephan
(74) *Attorney, Agent, or Firm* — Hammer & Associates, P.C.

(57) ABSTRACT

A method for erecting or assembling a frame includes the steps of: forming a joint with at least two frame members placed at an angle to one another, each frame members is a metal tube, no coping nor fittings are used to form the joint; welding the frame members together at the joint; wrapping the joint with a saddle, the saddle is a bent flat metal member with at least one hole overlaying each frame member; and fastening the saddle to each frame member by inserting a screw through each hole.

15 Claims, 7 Drawing Sheets

(56) References Cited

U.S. PATENT DOCUMENTS

| | | | |
|---|---|---|---|
| 5,013,176 A | 5/1991 | Orbom | |
| 5,284,289 A | 2/1994 | Killian | |
| 5,918,998 A | 7/1999 | Pourmand | |
| 6,003,280 A * | 12/1999 | Wells | E04B 1/08 52/653.1 |
| 6,089,778 A | 7/2000 | Hirano et al. | |
| 6,205,739 B1 | 3/2001 | Newlin | |
| 6,402,414 B1 | 6/2002 | Kanodia et al. | |
| 6,460,297 B1 * | 10/2002 | Bonds | E04C 2/384 52/234 |
| 6,962,262 B2 | 11/2005 | Toma | |
| 7,143,550 B1 | 12/2006 | Lopez | |
| 2001/0000119 A1 | 4/2001 | Jaekel et al. | |
| 2005/0084324 A1 | 4/2005 | Dubensky et al. | |
| 2007/0246235 A1 | 10/2007 | Connell et al. | |
| 2008/0238144 A1 | 10/2008 | Kamimae | |
| 2010/0018131 A1 * | 1/2010 | Green | E04B 1/24 52/79.5 |
| 2013/0300097 A1 * | 11/2013 | Garceau | B62D 21/02 280/789 |
| 2017/0312563 A1 | 11/2017 | Chen | |

OTHER PUBLICATIONS

The Basics of Steel Conduit, "The strength and versatility of this oft-refined product line maintain its popularity on many a jobsite," dated Oct. 25, 2016.

Migwelding, "Plug Welding," dated Oct. 25, 2016.

* cited by examiner

CONNECTION SYSTEM AND METHOD OF USING SAME

RELATED APPLICATIONS

This application is a continuation-in-part of U.S. patent application Ser. No. 15/729,963 filed Oct. 11, 2017, now U.S. Pat. No. 10,280,607, which claims the benefit of U.S. Provisional Application Ser. No. 62/413,578 filed Oct. 27, 2016.

FIELD OF THE INVENTION

The invention is directed to a connection system used in the erection of framing.

BACKGROUND OF THE INVENTION

A framing system may be a structural (i.e., load bearing) system, or a non-structural (i.e., a non-load bearing) system. A non-structural framing system is not intended for use in load bearing applications. Non-structural framing systems have practical applications including, for example, building mock-ups or light-weight structures, prototyping, product development, shop work, fencing, tent frames, awnings, theater/stage structures, artistic structures, and the like.

In typical frames made with metal tubing, the joints have to be coped (i.e., cut to fit, e.g., beveled) and then joined, or joints are formed with fittings or with metal strapping and screws. Both of these techniques are time consuming, and therefore, they are not used for this type of framing.

Accordingly, there is a need for a framing system and method for making same that is easily assembled of readily available components. The framing system may be a non-structural framing system.

SUMMARY OF THE INVENTION

A method for erecting or assembling a frame includes the steps of: forming a joint with at least two frame members placed at an angle to one another, each frame members is a metal tube, no coping nor fittings are used to form the joint; optionally welding the frame members together at the joint; wrapping the joint with a saddle, the saddle is a bent flat metal member with at least one hole overlaying each frame member; and fastening the saddle to each frame member by inserting a screw through each hole.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

Figure 1:
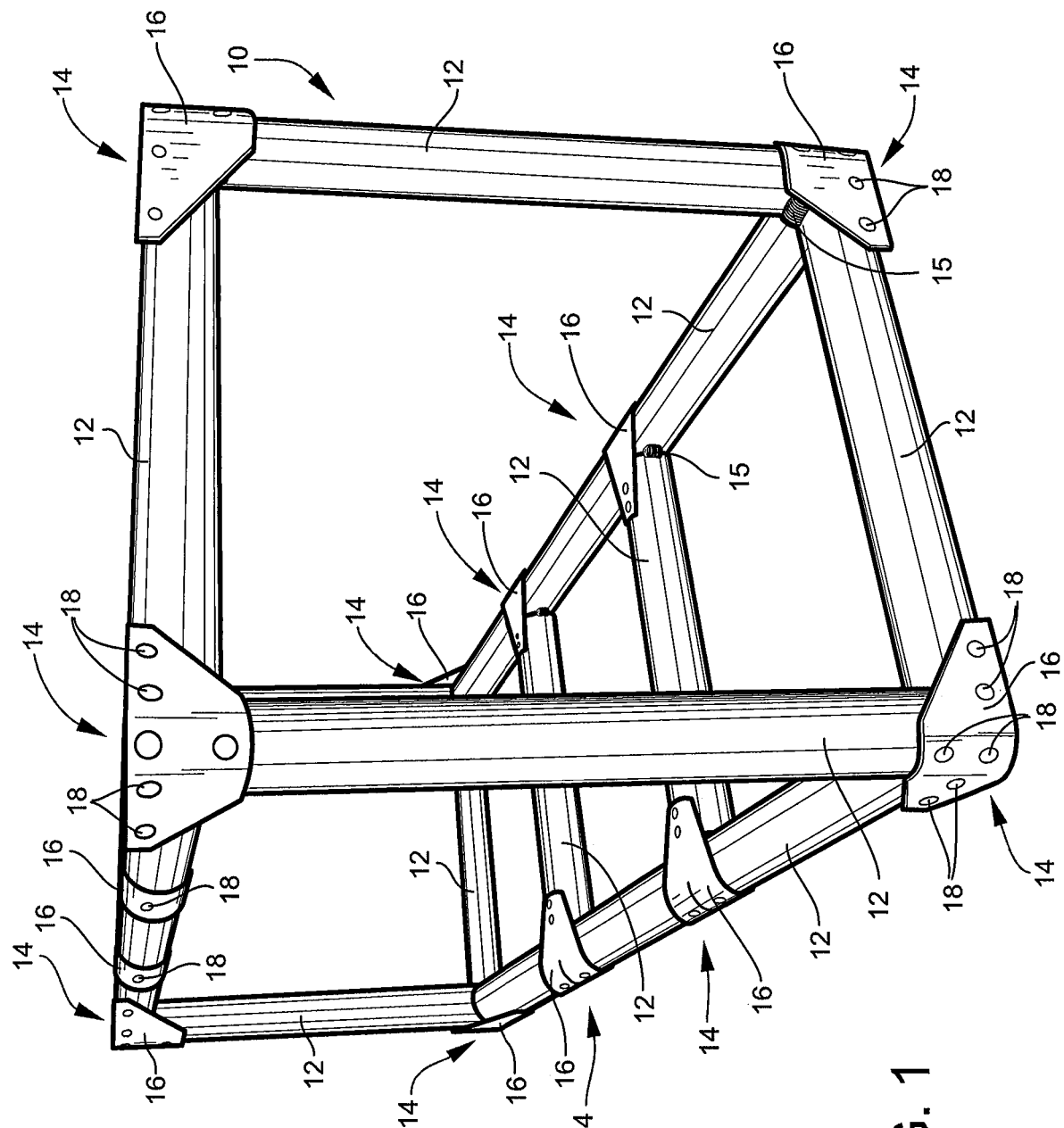
FIG. 1 is an isometric view of a frame make with an embodiment of the instant invention.
Figure 2:
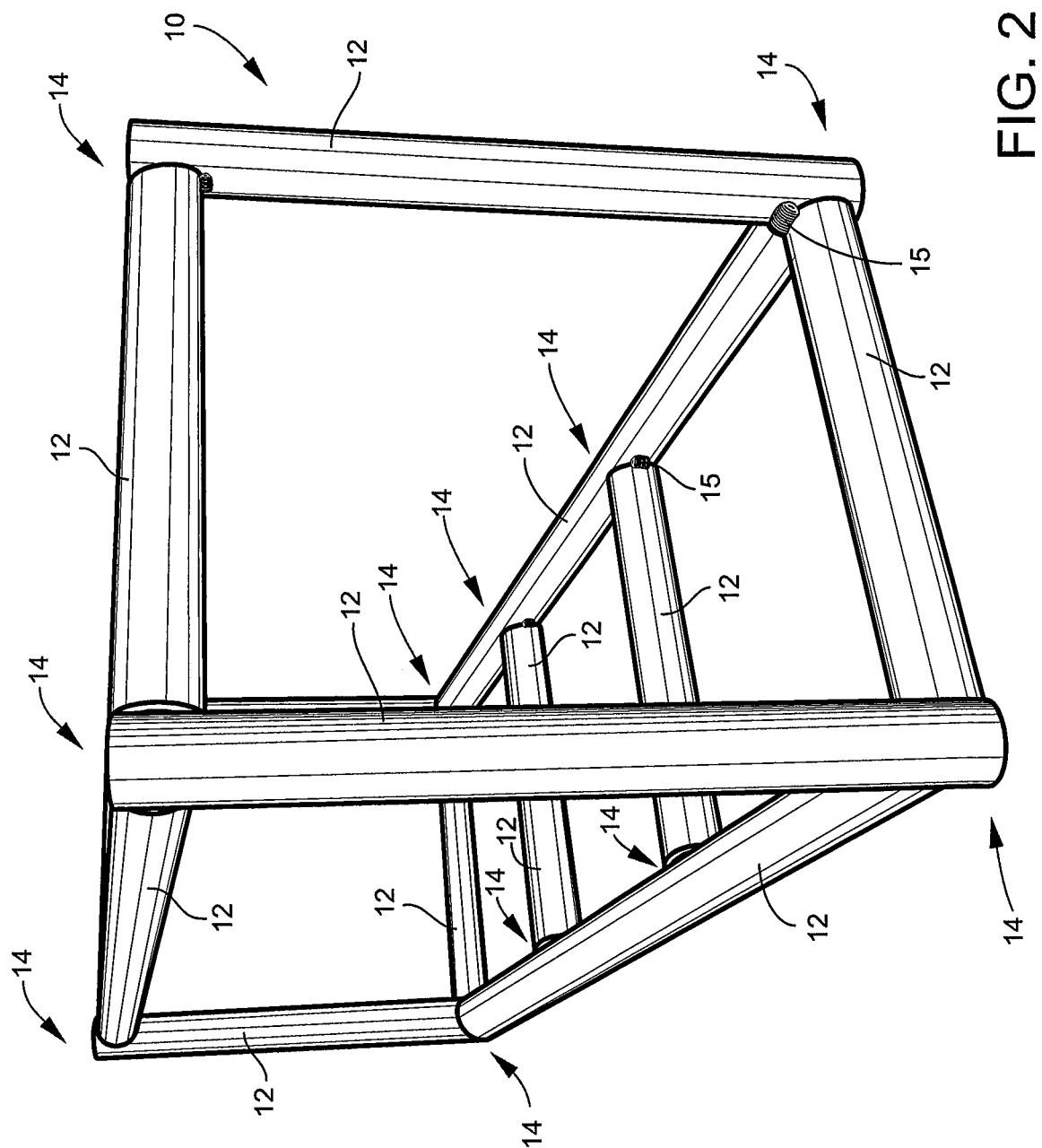
FIG. 2 is an isometric view of the tack welded frame.

Referring to the drawings, where like numerals are used to indicate like elements, there is shown a connection system for erecting frame. The framing 10 may be a structural system or a non-structural system. Non-structural frames are frames that are not load bearing. To simply the discussion hereinafter, only a non-structural framing system will be discussed, but the system described below may be equally applicable to a structural framing system.

Referring to FIG. 1, assembled frame 10 is illustrated. Frame 10 includes several frame members 12 and joints 14 with saddles 16 plug welded 18 to frame members 12.

Frame members 12 are members. The frame members 12 may be tubular or solid. The frame members 12 may have any cross-sectional shape including, but not limited to circular, oval, square, rectangular, trapezoidal, L, and/or T. Frame members 12 may be electrical metallic tubing conduit, for example thin-walled conduit. Electrical metallic tubing may refer to any such conduit, for example, see: http://ecmweb.com/content/basics-steel-conduit and https://en.wikipedia.org/wiki/Electrical_conduit, both incorporated herein by reference. Frame members 12 may be made of thicker walled tubing, for example, black iron pipe (water pipe), if a structural framing system is desired.

Figure 3:
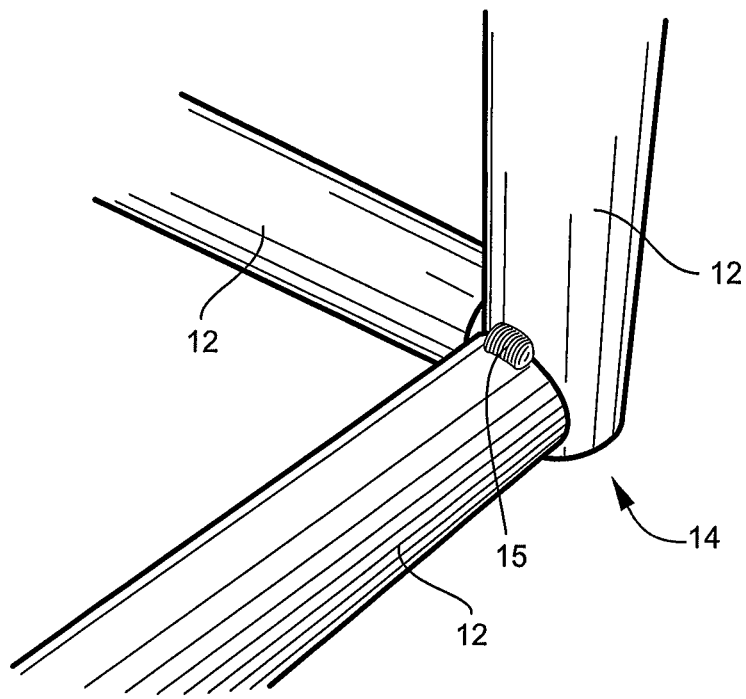
FIG. 3 is a view of a tack weld.
Figure 7:
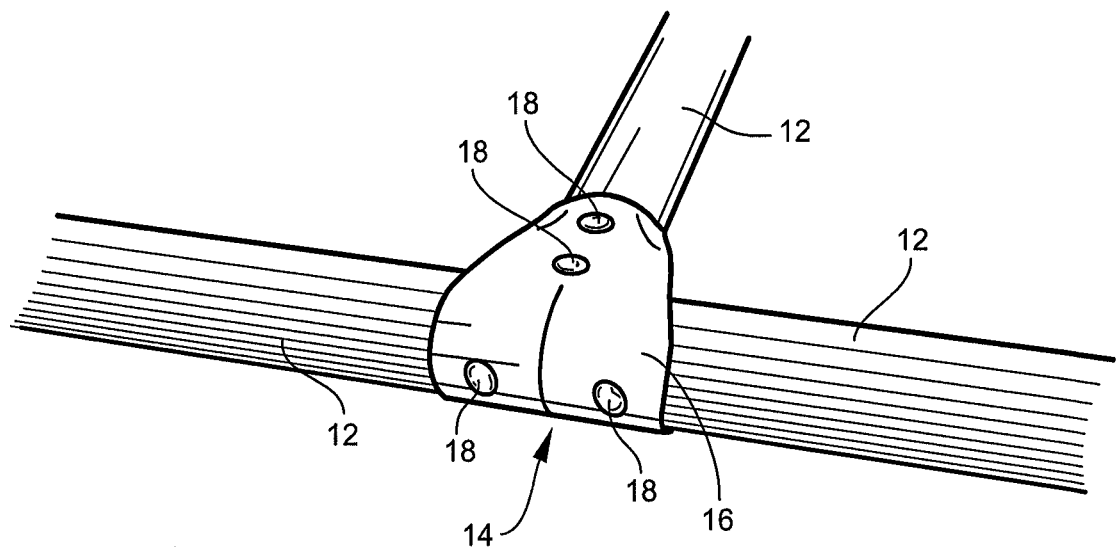
FIG. 7 is a view of finished plug welds.
Figure 9:
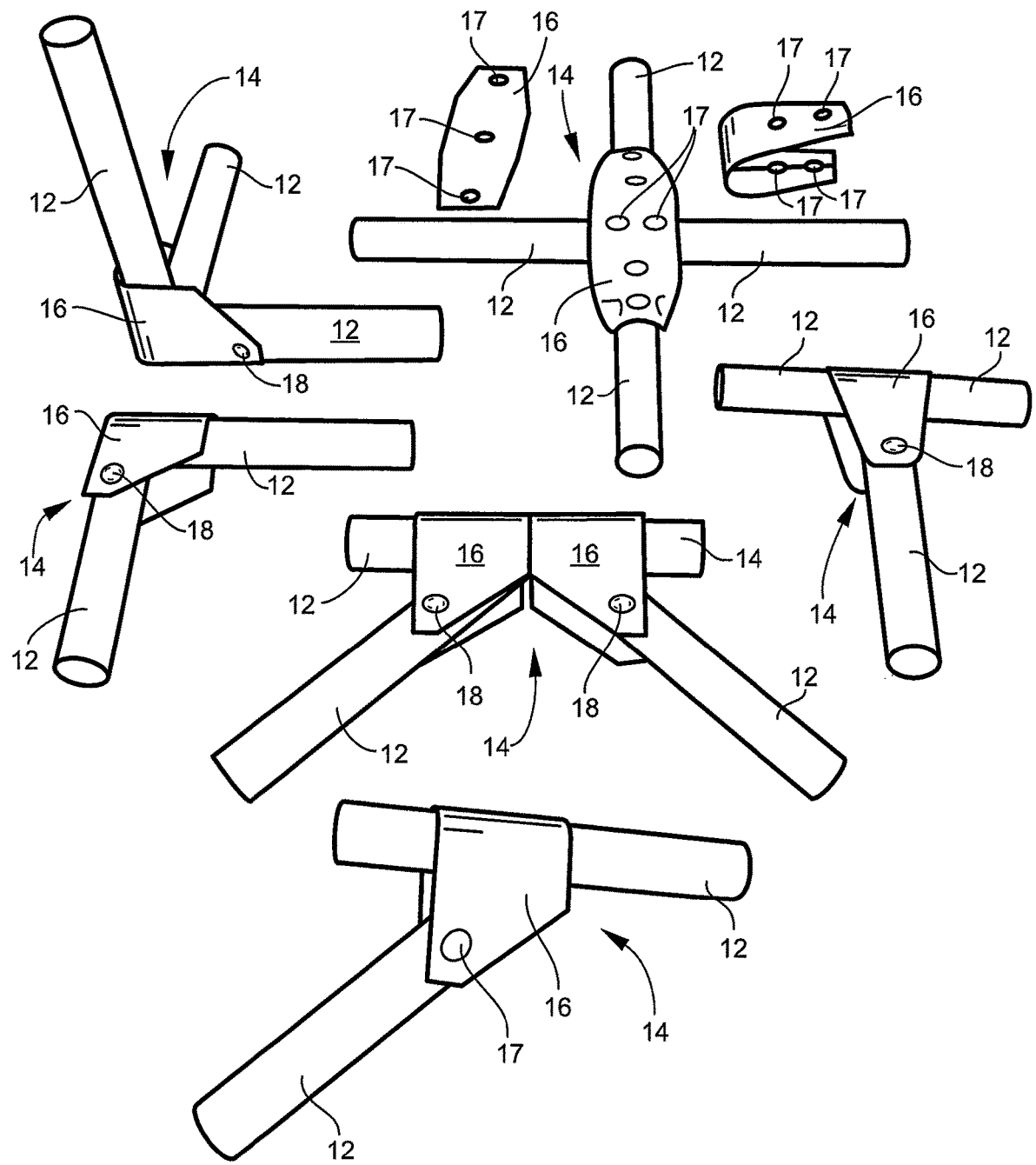
FIG. 9 is a view of several examples of joints made according to the instant invention.

Joint (or cluster) 14 is formed with at least two frame members 12 placed at an angle to one another. In joint 14, each frame member 14 abuts another member, see, for example, FIG. 3. The angles include, for example, 90°, 180°, and 45°, but the angle may be any angle as necessitated by the frame 10. Exemplary angles are shown in FIG. 3 (corner joint), FIG. 7 (T joint), and FIG. 9 (multiple joints illustrated). No coping nor fittings are used to form the joint.

Figure 4:
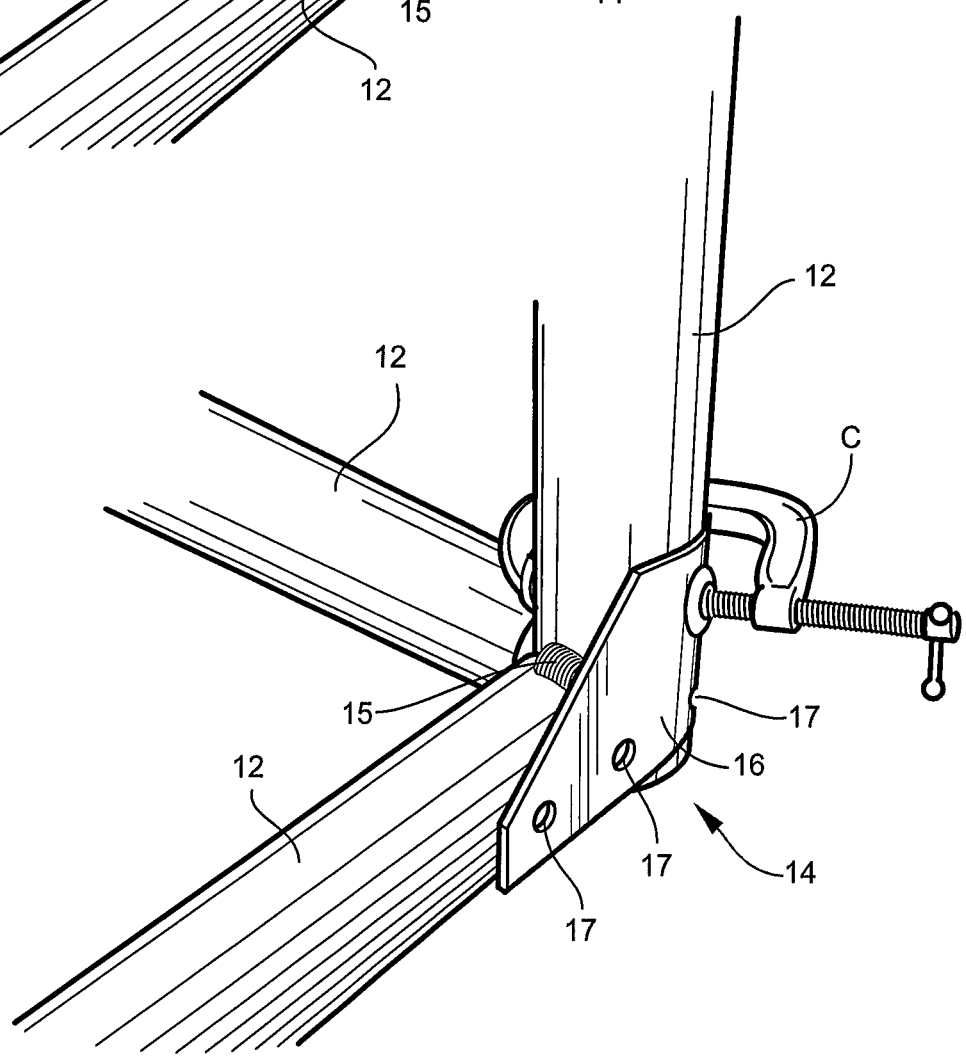
FIG. 4 is a view of holding (or clamping) a saddle to members prior to plug welding.
Figure 5:
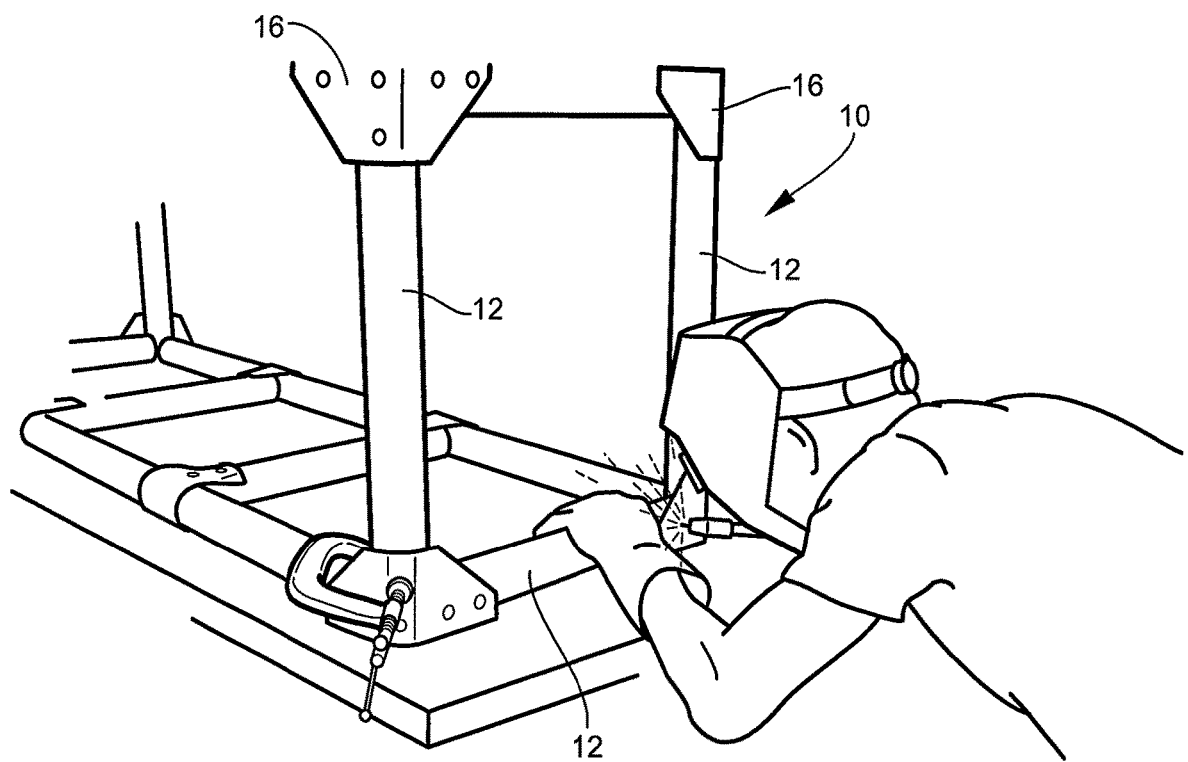
FIG. 5 is a view of forming the plug welds.
Figure 6:
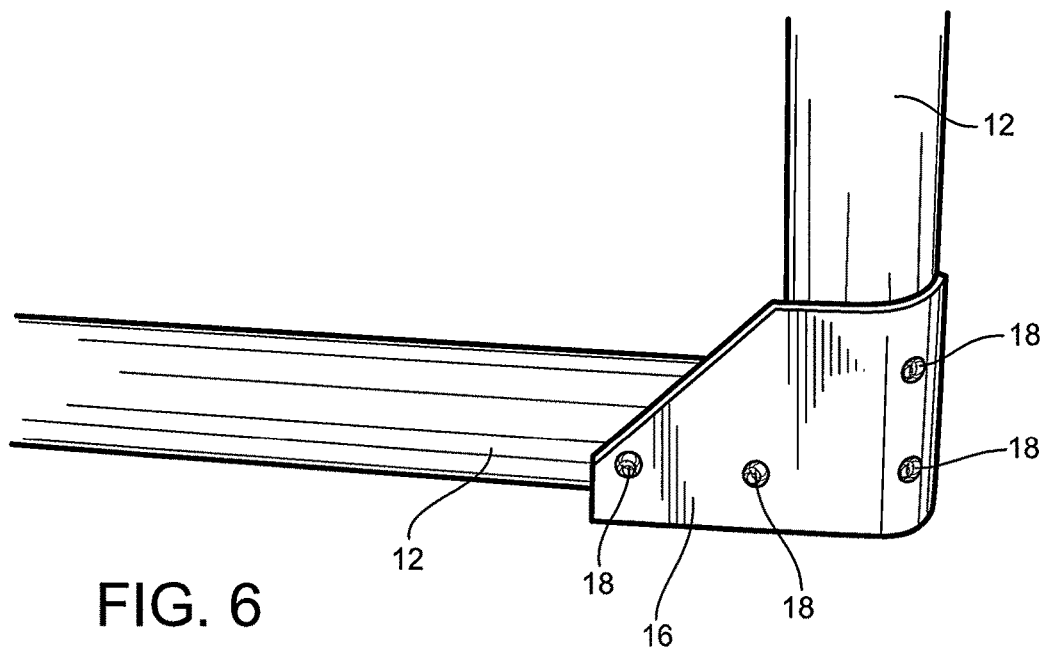
FIG. 6 is a view of plug welds prior to finishing.
Figure 8:
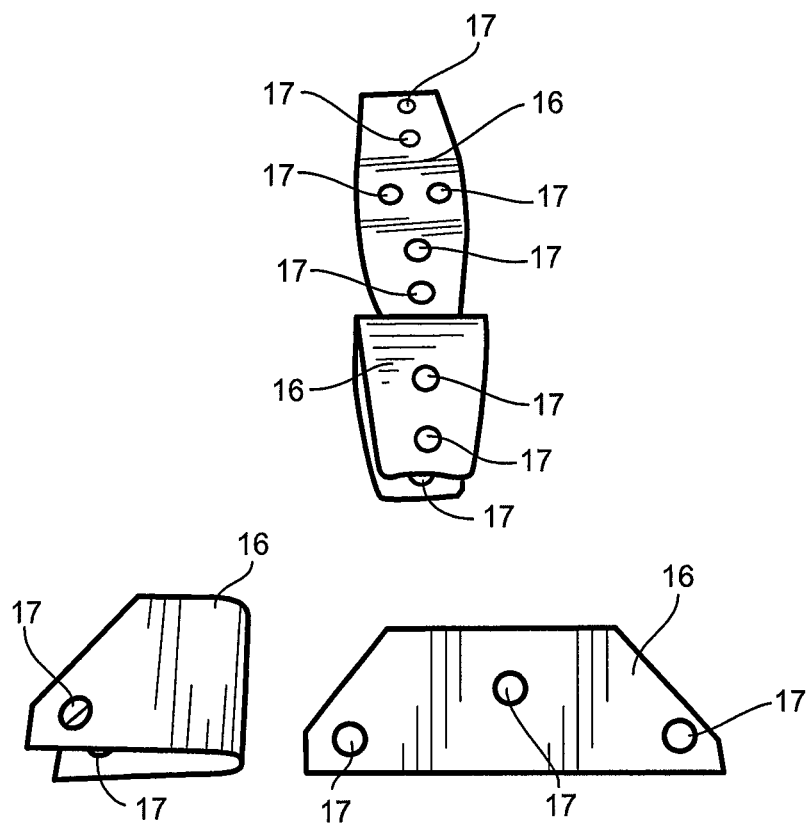
FIG. 8 is a view of several saddles.

Saddle 16 is wrapped around the joint 14. Saddle 14 may be a flat metal member with at least two holes 17 therethrough, a hole 17 overlays each frame member 12, see for example FIG. 4. Wrapped around, as used herein, may mean that the saddle may be initially a flat member, but when placed around the joint, the saddle may be bent and/or bent and contoured and/or contoured to fit snuggly around the frame members. The saddle 16 may be malleable, so that the saddle may be bent around the joint. The saddle 16 should snuggly fit around, or be contoured to, or be in intimate contact, with the frame members, so as to avoid any free space therebetween (e.g., reduce the chance of movement between the saddle and the frame members). The saddle 16 may have a variety of shapes, for example see FIGS. 6-8. Hole 17 may be punched in the flat metal member. Any number (e.g., 1, 2, 3 . . . ) of holes 17 may be in saddle 16, so long as there is at least one hole associated with each frame member. In some embodiments, there may be two holes associated with each frame member. The number of holes associated with each frame member need not be the same. In the embodiment shown in FIG. 4, the saddle 16 is a corner saddle with two holes 17 overlaying the post frame member, two holes 17 overlaying the one frame member, and two holes 17 overlaying the third frame member (not visible).

Plug welds 18 are used to fill the holes 17 in the saddle 16 and join the saddle 16 to the frame member 12. Plug welds are not spot weld, see http://www.mig-welding.co.uk/plug-weld.htm, incorporated herein by reference. With plug welding, a weld metal, for example from a wire welder (such as a MIG welder), fills the hole 17 in saddle 16, joins the saddle 16 to the frame member 12, and secures the joint 14 from movement.

In erection (or assembly), see generally FIGS. 2-7, frame members 14 are abutted together. No coping or fitting (i.e., cutting) of the tubular frame members is necessary. The frame members 14 may be tacked (or tack welded) 15 together, see FIGS. 2-3. Saddle 16 is wrapped around the joint 12, so that at least one hole 17 of the saddle 16 overlays each of the frame members 12. The saddle 16 is temporarily affixed to the joint 14, for example with a clamp C (a C-clamp is shown), see FIG. 4. Saddle 16 is then plug welded to the frame members 12, see FIGS. 5-7. With plug welding, a weld metal fills the hole 17 of saddle 16 and joins the saddle 16 to the frame member 12. The clamp is then removed, any excess weld metal may be removed (e.g., grinding), and the plug weld is finished, as necessary or desired. After all plug welding, the frame 10, see FIG. 1, is ready for use.

Figure 10:
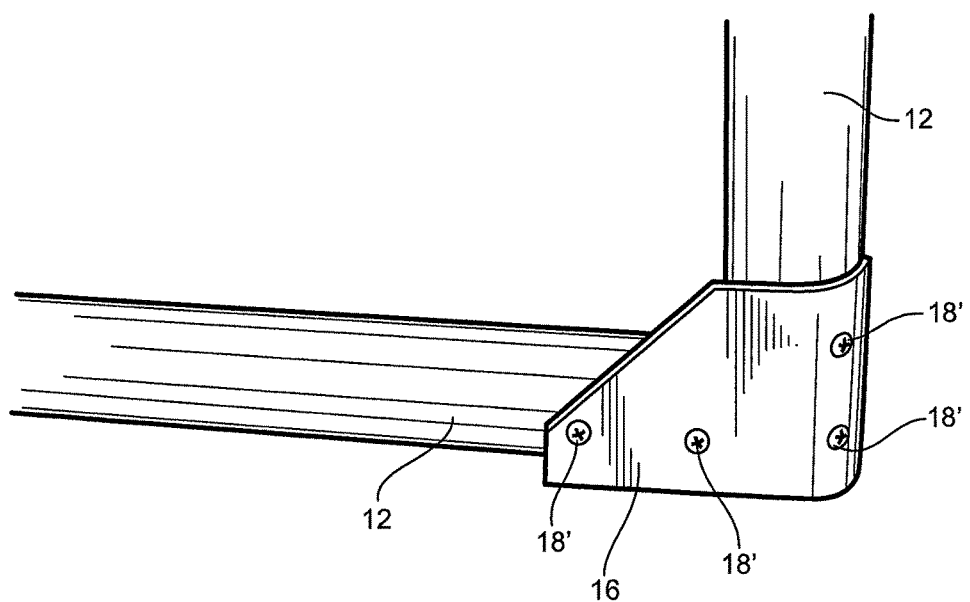
FIG. 10 is a view of an alternate embodiment.

In an alternate embodiment, plug weld 18 is replaced with a screw 18'. Screw 18' may be any screw. One such screw may be a sheet metal screw. The use of the screw 18', instead of plug weld 18 may decrease the assembly time and/or facilitate clean-up. In erection (or assembly), frame members 14 are abutted together. No coping or fitting (i.e., cutting) of the tubular frame members is necessary. The frame members 14 may be welded 15 together, see FIGS. 2-3. The weld 15 may be a tack weld or a longer weld around the joint. Saddle 16 is wrapped around the joint 12, so that at least one hole 17 of the saddle 16 overlays each of the frame members 12. The saddle 16 may be temporarily affixed to the joint 14, for example with a clamp C (a C-clamp is shown), see FIG. 4. A hole may be formed (e.g., drilled) into the frame member using the hole in the saddle 16 as a guide. Saddle 16 is then screwed, with screw 18', to the frame members 12, see FIG. 10. After filling all the saddle holes with screws 18', the frame 10, see is ready for use.

The present invention may be embodied in other forms without departing from the spirit and the essential attributes thereof, and, accordingly, reference should be made to the appended claims, rather than to the foregoing specification, as indicated the scope of the invention.

I claim:

1. A method for erecting or assembling a frame comprises the steps of:
    forming a joint with at least two frame members placed at an angle to one another, each of the frame members is a metal tube, no coping nor fittings are used to form the joint;
    wrapping the joint with a saddle, the saddle is a bent flat metal member with a bight with a hole and two arms, each with a hole overlaying each of the frame member; and
    fastening the saddle to each of the frame members by inserting a screw through the hole in the bight and each hole in the arms.

2. The method of claim 1 wherein the bent flat metal member has at least two holes overlaying each of the frame members.

3. The method of claim 1 wherein the saddle is contoured to the frame members.

4. The method of claim 1 wherein the metal tube is an electrical conduit.

5. The method of claim 1 wherein the frame is a non-structural frame.

6. The method of claim 1 further comprising the step of:
    creating a hole in the frame member using the at least one hole of the saddle as a guide.

7. The method of claim 1 further comprising the step of:
    creating a hole in the frame member corresponding to the at least one hole of the saddle.

8. A frame comprises:
    a joint formed by at least two frame members set at an angle to one another, each of the frame members is a metal tube, no coping nor fittings are used to form the joint;
    a saddle is wrapped over the joint, the saddle is a flat metal member with a bight with a hole and two arms, each with a hole overlaying each of the frame members; and
    a screw through the at least one hole into the frame members joins the saddle to each frame members.

9. The frame of claim 8 wherein the flat metal member has at least two holes overlaying each of the frame members.

10. The frame of claim 8 wherein the saddle is contoured to the frame members.

11. The frame of claim 8 wherein one frame member has a hole therethrough and the hole in the frame member corresponds to one hole of the saddle.

12. The frame of claim 7 wherein each of the frame members has a hole therethrough corresponding to each hole of the saddle.

13. A saddle comprises:
    a bent flat metal member with a bight with a hole and two arms, each with a hole,
    wherein the saddle surrounds a joint in a frame connection system having at least two frame members by overlaying the at least two frame members and no coping or fittings are used to form the joint.

14. The saddle of claim 13 wherein the flat metal member has at least two holes overlaying at least two frame members.

15. The frame of claim 13 wherein the saddle is contoured to the at least two frame members.

* * * * *